United States Patent [19]
Fischer

[11] Patent Number: 5,975,560
[45] Date of Patent: Nov. 2, 1999

[54] APPARATUS FOR SECURING A GAS BAG MODULE

[75] Inventor: Anton Fischer, Heuchlingen, Germany

[73] Assignee: TRW Occupant Restraint Systems GmbH, Alfdorf, Germany

[21] Appl. No.: 08/927,718

[22] Filed: Sep. 11, 1997

[30] Foreign Application Priority Data

Sep. 27, 1996 [DE] Germany ............... 296 16 891 U

[51] Int. Cl.⁶ ................................................. B60R 21/16
[52] U.S. Cl. ................................. 280/728.2; 280/731
[58] Field of Search ........................ 280/728.2, 731, 280/728.1

[56] References Cited

U.S. PATENT DOCUMENTS

| | | | |
|---|---|---|---|
| 5,235,146 | 8/1993 | Suzuki | 200/61.54 |
| 5,310,218 | 5/1994 | Miyoshi et al. | 280/777 |
| 5,427,406 | 6/1995 | Zushi et al. | 280/728.2 |
| 5,603,524 | 2/1997 | Barnes et al. | 280/728.2 |
| 5,741,024 | 4/1998 | Enders | 280/728.3 |
| 5,768,948 | 6/1998 | Hosoi et al. | 74/552 |

*Primary Examiner*—Christopher P. Ellis
*Attorney, Agent, or Firm*—Tarolli, Sundheim, Covell, Tummino & Szabo L.L.P.

[57] ABSTRACT

An apparatus for securing a gas bag module to a vehicle part, more particularly to a steering wheel hub, is provided, in which the vehicle part comprises at least one protruding mounting part having one end split into two webs. The gas bag module has a housing comprising at least one pre-mounted bolt screwed into a side of one of the housing and a part connected thereto. The bolt has a shank engaging between the webs during mounting of the gas bag module on the vehicle part. The bolt has a bolt head and is supported on the mounting part by the bold head in subsequent tightening.

4 Claims, 1 Drawing Sheet

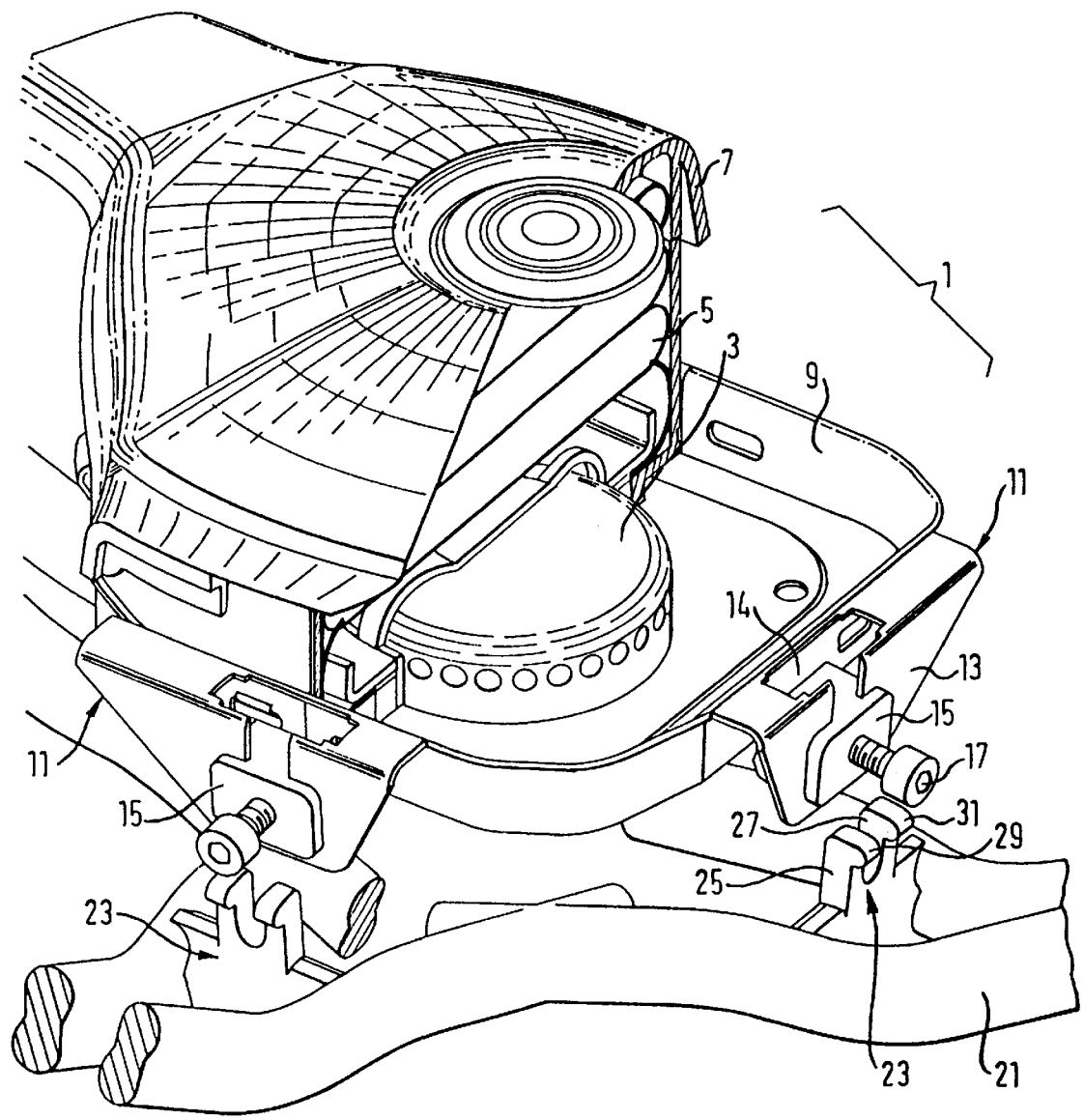

APPARATUS FOR SECURING A GAS BAG MODULE

The invention relates to an apparatus for securing a gas bag module to a vehicle part, more particularly for securing to a steering wheel hub.

BACKGROUND OF THE INVENTION

Hitherto, gas bag modules have been bolted to the front side or rear side of a steering wheel. For this purpose, mostly nuts are utilized which are fixed non-rotatably at the housing of the gas bag module and into which the corresponding bolts are then screwed during assembly. These bolts need to be applied separately, correctly positioned and screwed in place which is time-consuming. In addition to this, the bolts are often difficult to access for screwing-in which increases the time needed for assembly.

BRIEF DESCRIPTION OF THE INVENTION

The invention provides a means of an apparatus for securing a gas bag module to a vehicle part which permits speedy and efficient assembly. According to the invention, an apparatus for securing a gas bag module to a vehicle part, more particularly to a steering wheel hub, is provided, in which the vehicle part comprises at least one protruding mounting part having one end split into two webs. The gas bag module has a housing comprising at least one pre-mounted bolt screwed into one of a side of the housing or a part connected thereto. The bolt has a shank engaging between the webs during mounting of the gas bag module at the vehicle part. The bolt has a bolt head and is supported on the mounting part by the bold head in subsequent tightening. Due to the apparatus in accordance with the invention, the gas bag module can be furnished to the vehicle manufacturer with a pre-mounted securing bolt already in place, the vehicle manufacturer not being required to apply any separate bolts during assembly. Since the pre-mounted bolt protrudes from one side of the gas bag module and sufficient room is available for assembly means, pre-assembly can be done mechanized. For fitting the gas bag module, it merely needs to be located on the vehicle part so that the bolt shank is pushed between the webs of the mounting part, and subsequently the bolt is screwed in so far that it becomes supported by its bolt head on the mounting part and presses the housing of the gas bag module to the mounting part. The maximum assembly times for the furnished gas bag modules dictated to the suppliers by the vehicle manufacturers can be more easily maintained by the apparatus in accordance with the invention.

In the preferred embodiment, each of the webs comprises at its free end on the side facing the bolt head a laterally protruding nose under which the bolt head engages when the bolt is screwed in and thus interlocks said gas bag module to the vehicle part. As a result of this, an interlocking connection of the vehicle part to the gas bag module materializes, the latter being fixed even in case the bolt is not fully tightened or becomes loose.

Further features and advantages of the invention will be appreciated from the following description of a preferred embodiment and from the drawing to which reference is made.

BRIEF DESCRIPTION OF THE DRAWING

The drawing shows a perspective view of a gas bag module and a steering wheel hub which are connected to each other by a means in accordance with the invention.

DETAILED DESCRIPTION OF A PREFERRED EMBODIMENT

In the figure, a gas bag module 1 is depicted which includes a gas generator 3 and a gas bag 5, the module 1 being surrounded by a cover 7. The module 1 includes further a tray-shaped housing 9 of sheet metal. From the side of the outer edge of the housing 9, several tabs 11 protrude, of which only two are shown, these tabs 11 being integrally connected to the housing 9. The ends 13 of the tabs are angled downwardly. A recess 14 in each tab 11 permits inserting a nut 15 provided with side grooves into the part of the recess 14 extending into the region of the end 13. The edges of each recess 14 protrude into the grooves of the nuts 15, as a result of which they are secured non-rotatably to the housing 9. Screwed into each nut 15 by a few turns of the thread from without is a thread-forming bolt 17.

A steering wheel 21, of which only the skeleton is shown, comprises in the region of the steering wheel hub several mounting parts 23 molded thereto. These mounting parts 23 stand off approximately at right angles from the upper side of the steering wheel hub and each features a free end which is split into two webs 25, 27. The interspace between the webs 25, 27 is slightly wider than the diameter of the bolts 17. Each of the webs 25 and 27 features at its free end a nose 29 and 31 respectively protruding outwardly at the side.

For fitting the gas bag module 1, it is simply placed from above on the steering wheel hub with the pre-mounted bolts 17, the shanks of the bolts engaging between the webs 25, 27. In subsequent tightening of the bolts 27 the bolt heads wander under the noses 29, 31 so that an interlocking connection materializes between the gas bag module 1 and the steering wheel 21. Even when the bolts 17 are not fully tightened, i.e. the nuts 15 not being pressed to the rear side of the mounting parts 23 and the bolt heads are not supported at the front side by the mounting part 23, any pulling-out of the gas bag module 1 is not possible.

The tabs 11 protruding to the side offer the advantage that they are able to slightly bend and thus compensate any minor longitudinal tolerances between the tabs 11 on the one hand and the mounting parts 23 on the other, when the bolts 17 are tightened.

Since each bolt 17 is already pre-mounted, the time needed to fit the gas bag module 1 is reduced. In addition to this, faulty boltings in fitting the gas bag module 1 due to bolts not being fully screwed in can be avoided since due to the good access to the bolts 17 it is possible to provide an automatic position checking means for the bolts 17 after screwing-in.

I claim:

1. An apparatus for securing a gas bag module to a vehicle part, more particularly to a steering wheel hub, said vehicle part comprising at least one protruding mounting part having one end split into two webs, said gas bag module having a housing comprising at least one pre-mounted bolt screwed into a side of one of said housing and a part connected thereto, said bolt having a shank engaging between said webs during mounting of said gas bag module on said vehicle part, said bolt having a bolt head and being supported on said mounting part by said bolt head in subsequent tightening, wherein said housing of said gas bag module comprises at least one laterally protruding tab which is angled downwards, said pre-mounted bolt being screwed in or secured to said downwardly angled end of said tab, wherein a groove-like recess is provided in said downwardly angled end of said tab, and said recess accommodating a nut provided with lateral grooves and adapted to receive said bolt.

2. The apparatus of claim 1, wherein said bolt is one of a self-tapping and a thread-forming bolt.

3. An apparatus for securing a gas bag module to a vehicle part, more particularly to a steering wheel hub, said vehicle part comprising at least one protruding mounting part having one end split into two webs, said gas bag module having a housing comprising at least one pre-mounted bolt screwed into a side of one of said housing and a part connected thereto, said bolt having a shank engaging between said webs during mounting of said gas bag module on said vehicle part, said bolt having a bolt head and being supported on said mounting part by said bolt head in subsequent tightening, wherein each of said webs has a free end and comprises a laterally protruding nose at said free end on a side facing said bolt head, and said bolt head engaging behind said nose when said bolt is screwed in, so that said gas bag module and said vehicle part are connected to each other in an interlocking manner.

4. An apparatus for securing a gas bag module to a steering wheel hub of a steering wheel, said steering wheel hub comprising at least one protruding mounting part having one end split into two webs, said gas bag module having a housing comprising at least one pre-mounted bolt screwed into a side of one of said housing and a part connected thereto, said bolt having a shank engaging between said webs during mounting of said gas bag module on said vehicle part, said bolt having a bolt head and being supported on said mounting part by said bolt head in subsequent tightening, and said steering wheel having an outer surface and a steering wheel skeleton, wherein several of said mounting parts protrude roughly at right angles from said outer surface of said steering wheel hub and are formed on said steering wheel skeleton.

* * * * *